United States Patent [19]

Ledun

[11] Patent Number: 4,467,983
[45] Date of Patent: Aug. 28, 1984

[54] UNREELING DEVICE AND TAPE READER INCORPORATING SUCH AN UNREELING DEVICE

[75] Inventor: Michel Ledun, Paris, France
[73] Assignee: Thomson-CSF, Paris, France
[21] Appl. No.: 413,510
[22] Filed: Aug. 31, 1982
[30] Foreign Application Priority Data
Sep. 11, 1981 [FR] France .................. 81 17234
[51] Int. Cl.³ .......................... G03B 1/04; G03B 1/56; G11B 15/32
[52] U.S. Cl. ...................................... 242/195; 226/92; 242/197; 352/235
[58] Field of Search ............ 242/195, 197–208, 242/191, 75.3, 190; 352/235; 226/190, 193, 91, 92

[56] References Cited
U.S. PATENT DOCUMENTS
3,025,011 3/1962 Camras .
3,880,382 4/1975 Jantzen et al. ................ 242/195

FOREIGN PATENT DOCUMENTS
1044194 11/1953 France .

Primary Examiner—Leonard D. Christian
Attorney, Agent, or Firm—Oblon, Fisher, Spivak, McClelland & Maier

[57] ABSTRACT

Device permitting the winding and unwinding of a tape. It comprises a feed reel on which is wound a tape, and a take-up reel equipped with a tape driving strap. The leader of the tape and the free end of the strap are provided with mutual coupling means and are positioned so as to face the interior of a mechanical member for carrying out the operations of coupling and uncoupling the strap with respect to the tape. The device according to the invention is used more particularly in equipment for recording and reading data on a support such as a magnetic tape, a photographic film, a perforated tape, etc.

9 Claims, 18 Drawing Figures

FIG_1

FIG_2-a

FIG_2-b

FIG_3

FIG_4

FIG_5

FIG_6

FIG_7

FIG_8-a

FIG_9a

FIG_9·b

FIG_9-c

UNREELING DEVICE AND TAPE READER INCORPORATING SUCH AN UNREELING DEVICE

BACKGROUND OF THE INVENTION

The invention relates to a tape or strip unreeling device and its application to a tape reader or playback means.

A tape unreeling device makes it possible to transfer a tape wound onto a storage reel to a receiving reel and vice versa. In general, the tape comprises a data carrier on which analog or digital data can be recorded, played back or read and optionally erased. Such data carriers are known in various forms, e.g. photographic films, magnetic tapes, perforatable tapes, etc. As a function of the use of the tape unreeling device, the tape movement can be continuous, intermittent or jerky, as in cinematography technology. In addition, in certain applications, the tape unreeling device must operate in the two directions of movement, or at least must have the capacity to rewind the tape onto the storage reel. Tape unreeling devices of this type are known, particularly those used in cinematographic projection equipment.

There are two types, namely those having lateral insertion mainly used for 35 mm films and those with so-called automatic insertion for 8 mm or super 8 films. In the first type, after the operator has positioned the storage reel and after opening a lateral door, he inserts the leader of the film between the guide rollers and pulleys. He then attaches the leader of the film to the mandrel of the take-up reel. However, this operation is long and complex.

In the second type, the operator inserts the leader of the film in a slot, the film perforations engage with a toothed wheel, which transports the leader of the film in accordance with a given circuit. This leader is fastened to the take-up reel by wedging of the lateral flanges and then by friction between successive turns. However, there is frequently a risk of deterioration of the leader of the film and sometimes of the film itself as a result of untimely sliding and the poor engagement of the leader during its manual insertion. Moreover, this type of equipment requires relatively rigid films.

A tape reader makes it possible to read or even analyse data recorded on a support wound onto a reel. Various types of tape readers exist, particularly photographic film tape readers on which data are recorded in the form of contiguous images or pictures which are analysed by television scanning and are then displayed on the surface of a cathode ray tube.

The standard analysis procedure used is the flying spot process in which an extremely thin pencil of light scans the film surface. The light which passes through the film is trapped by a photoelectric cell in the case of monochrome pictures, or after separating the fundamental components of the light by means of a plurality of photoelectric cells in the case of polychrome pictures.

Unlike in cinematographic projection equipment in which the film strip moves in a jerky manner, in picture or image strip reading equipment, such as telecine equipment, the strip advances in a regular manner at a clearly defined speed, which greatly simplifies the equipment from the electronic standpoint compared with shooting cameras, but leads to mechanical problems. Thus, it is necessary to very accurately unwind the strip and modify the displacement of the light beam in order to compensate for the actual movement of the film. It is very difficult to obtain the required precision in view of the mechanical tolerances in connection with the production of the film, possible deterioration to the lateral transport perforations, sticking and contraction phenomena caused by temperature variations and the relative humidity of the air.

Another type of tape reader is encountered in the navigation field, particularly the field of aircraft navigation. In this type of tape reader, the tape is a data carrier, generally in the form of a photographic film on which are recorded pictures arranged in a predetermined order. These pictures correspond to maps of the regions which are liable to be overflown. The unwinding of the film is synchronous with the speed component of the aircraft, in accordance with one of the two coordinates of the map and the pencil of light of the film reader only analyses part of the picture and is displaced transversely and synchronously with the aircraft speed in accordance with the other coordinate of the map. Appropriate means make it possible to provide that part of the film corresponding to the geographical position of the aircraft in the reading channel of the reader. This tape reader is associated with a cathode ray tube cartographic indicator. In this type of tape reader, the strip of film is of large size and a large amount of data is recorded. The position of the pictures in the reading channel must be very accurately known. It must be possible for the strip or tape to unwind in both directions. The film strip must be changeable as required and the insertion of the start of the film must take place automatically.

Other types of equipment incorporating tape or strip unreeling means are in particular recorders on data carrier strips or tapes used in optical line scanning sensors, side beam radar equipment, sonar equipment, etc.

Thus, there is a very considerable demand for devices making it possible to unwind a tape on which is stored a large amount of data, i.e. a tape of considerable length and width able to record a large amount of data per surface unit. Thus, to permit the production of reels or spools having limited overall dimensions, the tape must have a limited thickness, so that it is more fragile and more difficult to insert in the device and in addition the high data density involves a precise guidance of the tape, the minimizing of mechanical clearances and the measurement of the position of the tape in the reading channel with a small error. Moreover, it is desirable for the tape to be inserted automatically onto the guide pulleys, into the reading channel and onto the receiving reel.

BRIEF SUMMARY OF THE INVENTION

To satisfy the aforementioned requirements, a device according to the invention makes it possible to unwind a data carrier tape and comprises a feed reel on which is placed the tape and a take-up reel equipped with a strap for driving or transporting said tape. The leader of the tape and the free end of the strap are provided with plug-in type mutual coupling means, which face one another in a plug-in mechanism incorporating a disengagement means.

Such a tape unreeling device can be used in an apparatus making it possible to read data recorded on a tape. The apparatus comprises a tape cartridge or cassette comprising a case provided with a positioning means for the leader of the tape. The start of the tape is automatically coupled with a driving strap joined to the take-up reel. The apparatus also comprises means for the lateral guidance of the tape in the reading channel and means for measuring the longitudinal position of the tape in the reading channel.

BRIEF DESCRIPTION OF THE DRAWINGS

The invention is described in greater detail hereinafter relative to non-limitative embodiments and with reference to the attached drawings, wherein show:

FIG. 8b a transverse view of the tape cartridge or cassette of FIG. 8a.

FIG. 8c a sectional view of the positioning supports for the tape leader of the cassette or cartridge of FIG. 8a.

FIG. 8d a lateral sectional view of the tape cartridge of FIG. 8a.

FIG. 8e a cross-sectional view of the cartridge of FIG. 8a.

FIG. 9b a rear transverse view of the tape reader of FIG. 9a.

FIG. 9c a sectional view of the tape guidance pulleys.

FIG. 10b a lateral sectional view of the mechanical member of FIG. 10a.

DETAILED DESCRIPTION OF THE PREFERRED EMBODIMENTS

Figure 1:
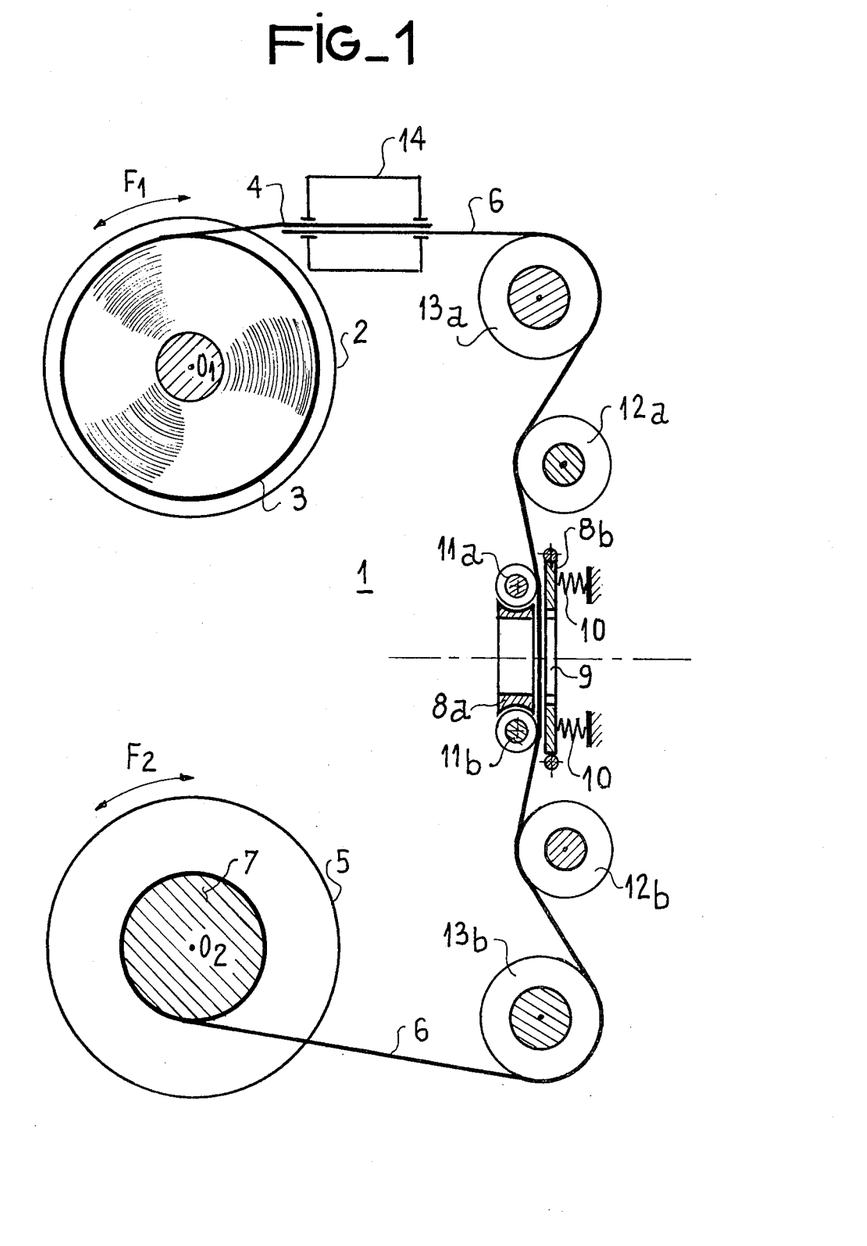
FIG. 1 in the form of a simplified mechanical diagram, a tape unreeling device according to the invention.

In the form of a simplified mechanical diagram, FIG. 1 shows a tape unreeling device 1 according to the invention and which essentially comprises: two reels advantageously located in the same plane, namely a storage or feed reel 2 on which is wound the tape, strip or data carrier 3, the leader 4 of said tape being accessible from outside the reel, and a take-up reel 5 provided with a strap 6 for driving or transporting the tape 3 to be unwound, one of the ends of said strap being rigidly attached to mandrel 7, whilst the other end, after inserting through the mechanisms of the device, is positioned in front of the end of the leader 4 of the tape, whereby the feed reel is of the detachable type and is able to freely rotate in both directions about axis O1 in the manner indicated by double arrow $F_1$, whilst the take-up reel is able to freely rotate in both directions about its axis O2, as indicated by the double arrow $F_2$.

A film pressing means comprises a fixed member 8a facing a transversely movable member 8b in order to form a passage and a film reading window 9, said movable member being maintained by pressure against the film by a set of springs 10.

A pair of rollers 11a, 11b are positioned on either side of the film pressing means.

A first set of pulleys 12a, 12b are provided for the longitudinal and transverse guidance of the tape.

A second set of pulleys 13a, 13b level with each of the two reels are provided for the purpose of returning the film and keeping constant the contact arc of the tape on the first set of pulleys independently of the film quantities wound onto the reels.

The leader 4 of the film strip or tape and the free end of the driving or transporting strap 6 are provided with coupling means, so that when these two members are positioned facing one another they can be joined together. With the aim of automating the operation of coupling the leader of the strip to the driving strap, the device also comprises a coupling mechanism 14 to be described in greater detail hereinafter.

Feed reel 2 and take-up reel 5 are coupled to rotation means not shown in the drawing. When the tape or strip 3 is a conventional cinematographic film provided with a set of lateral perforations, one of the guidance pulleys 12a, 12b can have teeth, which engage in the perforations and drive the pulley synchronously with the unwinding of the strip. An (not shown) angular position transducer, which is physically coupled to this guidance pulley can supply a signal representing the position of the strip in the reading channel.

Figure 2A:
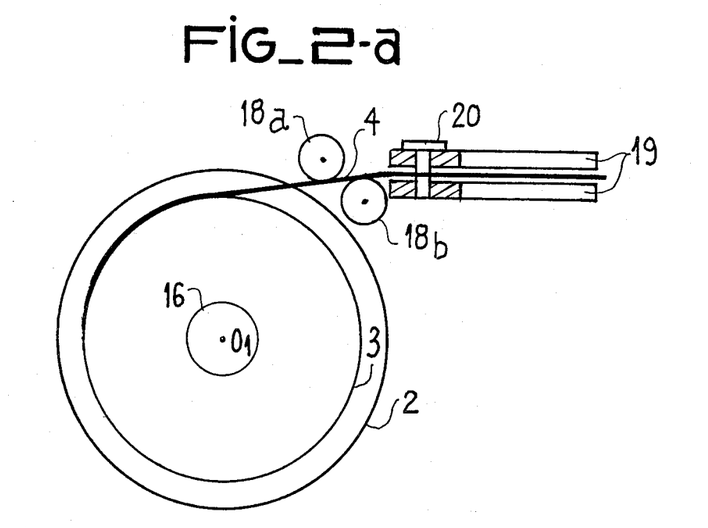
FIG. 2a a side view of the feed reel and the means for positioning the leader of the tape.
Figure 2B:
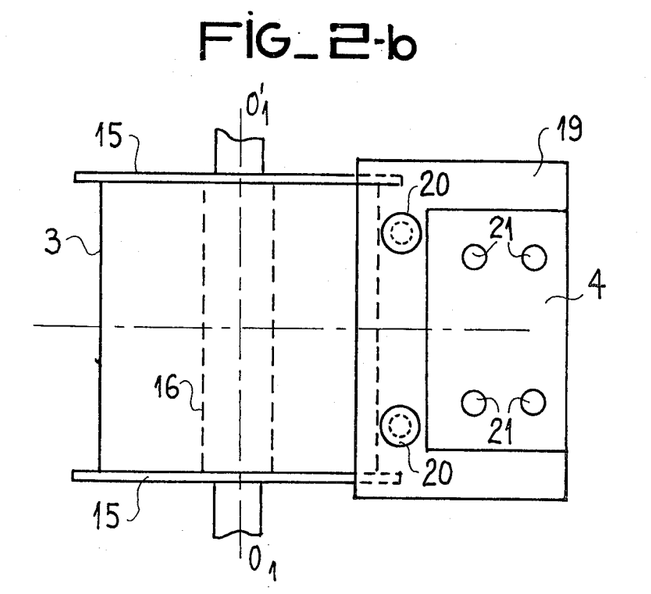
FIG. 2b a transverse view of the feed reel and the means for positioning the leader of the tape.

FIGS. 2a and 2b show in simplified form, respectively in a lateral view and a transverse view, details of the construction of feed reel 2 and the means for positioning the leader 4 of strip 3. The feed reel is a conventional reel or spool comprising a pair of flanges 15 integral with a mandrel 16 of axis O1—O'1. During its unreeling, the strip can be guided by a set of pulleys 18a, 18b, mechanically fixed to a frame, which supports the feed reel and optionally the means for rotating said reel on mandrel 16. The frame also supports a guidance member 19 incorporating positioning supports 20 for leader 4 of strip 3, said supports being able to occupy two stable positions. These positions consist of a low position, as shown, according to which the supports pass through the leader of the film and position the latter in guidance member 19, and a high position when the free end of the strap and the leader of the film have been coupled together. FIG. 2b shows that the leader 4 is provided with a set of buttons 21, which can be inserted in corresponding receptacles provided on the free end of strap 6 of take-up reel 5.

Figure 3:
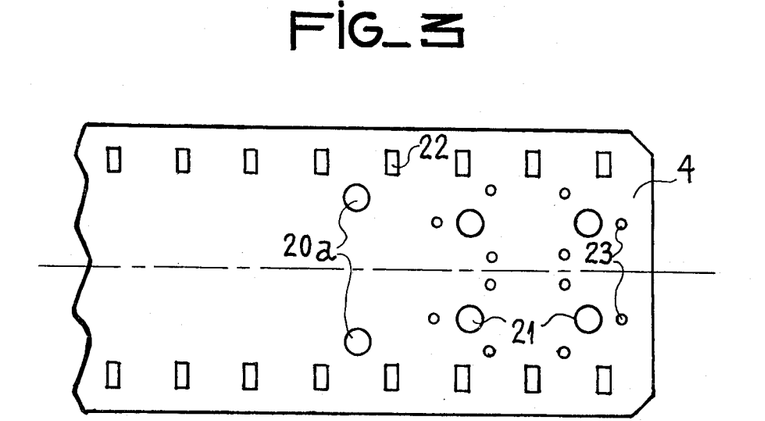
FIG. 3 an embodiment of the means for coupling the leader of the tape to the free end of the tape driving strap.

FIG. 3 shows the arrangement of the means for coupling the leader 4 of strip 3 to the driving or transporting strap 6. The strip or tape is, for example, a conventional photographic film, provided with lateral perforations 22. The leader of the film is provided with a set of suitably distributed buttons 21 and the said leader has circular perforations 20a for receiving the positioning supports 20 shown in FIGS. 2a and 2b. According to a constructional variant, the positioning supports have a rectangular cross-section and face the lateral perforations 22. The leader of the strip or tape also has rows of circular perforations 33, each row being regularly arranged around each of the buttons 21. The function of these circular perforations 23 is to permit the free passage of fingers for the purpose of disengaging coupling buttons 21 from the corresponding receptacles located on the free end of strap 6.

Figure 4:
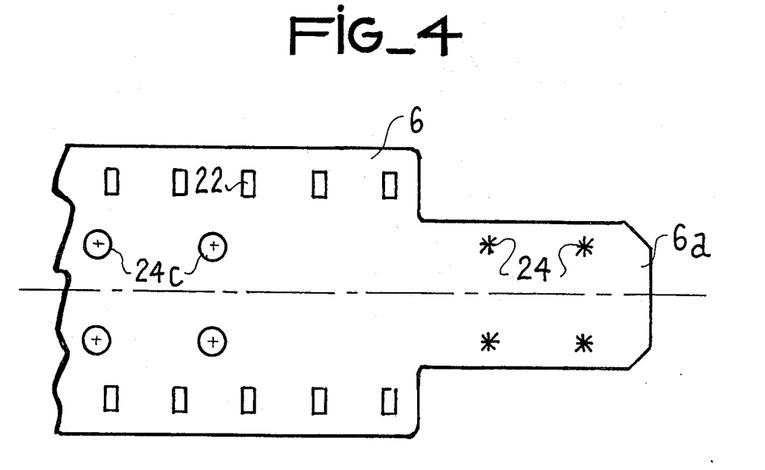
FIG. 4 an embodiment of the means for coupling the free end of the tape driving strap to the leader of the tape.

FIG. 4 shows the arrangement of the coupling means for the strap 6 with leader 4 of strip 3 shown in FIG. 3. The width of the driving or transporting strap 6 is equal to that of the strip or tape and is also provided with lateral perforations 22. The end portion 6a of the strap has a reduced width, so that it can fit into the corresponding portion of guidance member 19 of FIG. 2b. This end portion 6a of the driving strap is provided with a set of buttonholes 24 corresponding to the buttons 21 located on the leader of the strip. Strap 6 can be made from the same material as the strip 3 or can be made from a different material, e.g. a flexible metal such as copper or beryllium after heat treatment.

Figure 5:
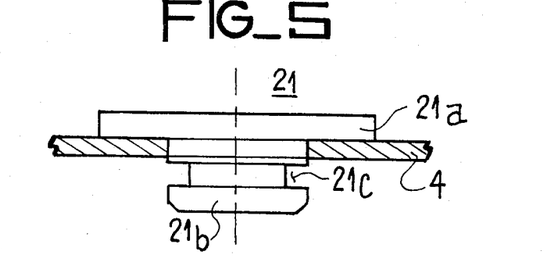
FIG. 5 an embodiment of the coupling buttons located on the leader of the tape.

FIG. 5 shows an embodiment of the coupling buttons 21 located on leader 4. A button consists of a head 21a of limited thickness and a base 21b, which has a circular groove 21c for engaging in a buttonhole 24 located on the free end of strap 6. These coupling buttons 21 can be held in place by adhesion to the leader of the strip. According to a variant, a button can be formed by two elements mounted on the leader of the strip.

Figure 6:
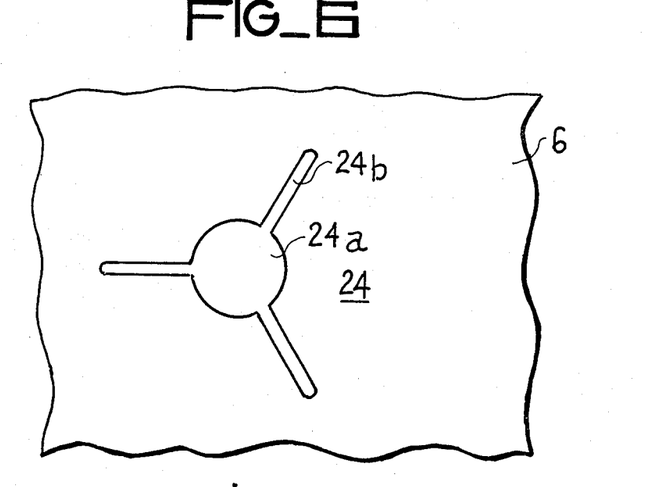
FIG. 6 an embodiment of the coupling buttonholes located on the free end of the tape driving strap.

FIG. 6 shows an embodiment of the buttonholes 24 located on the free end of the driving strap. A buttonhole is formed by a circular perforation 24a made in the strap, the diameter of said perforation being substantially equal to the internal diameter of groove 21c of button 21. In order to give the buttonhole a certain elasticity and permit its placement in groove 21a, linear perforations 24b are arranged around the circular perforation 24a, e.g. in the form of the three slots shown. According to a variant, these buttonholes can be female press studs.

Figure 7:
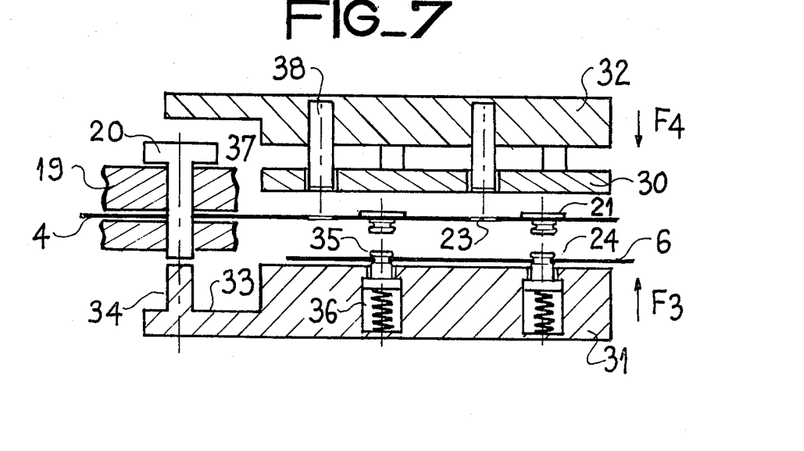
FIG. 7 a sectional view of the mechanical member making it possible to couple and uncouple the leader of the tape with the free end of the tape driving strap.

FIG. 7 is a sectional view showing the mechanical member 14 able to couple and uncouple the leader of the strip or tape to the free end of the driving or transporting strap. Member 14 has the following elements:

1. a fixed plate 30 integral with the frame of the unreeling device and positioned facing buttons 21 inserted in leader 4 of the strip and within the partly shown guidance member 19;

2. a first moving or coupling plate 31 positioned facing the fixed plate 30 and receiving the free end of strap 6, the movement of the first moving plate being indicated by arrow F3;

3. a second moving or uncoupling plate 32 facing and adjacent to the fixed plate 30, the movement of the second plate being indicated by arrow F4.

The first moving plate has a clearance 33 facing the positioning support 20. This clearance is provided with a pin 34 for displacing the positioning support towards the top of the drawing during the coupling operation of the leader 4 of strip 3 to strap 6. The first moving plate is provided with a set of sliding buttons 35 mounted elastically on springs in recesses 36, the function of these buttons being to maintain in place the free end of the driving strap, when the leader 4 of the strip is uncoupled and consequently fixed to the tape or strip cartridge or cassette.

The second moving plate 32 also has a clearance 37 facing the positioning support 20 for the purpose of moving said positioning support towards the bottom of the drawing during the uncoupling of leader 4 from strap 6. The second moving plate is provided with a row of fingers 38 facing perforations 23 with a view to bearing on the leader and uncoupling buttonholes 24 from buttons 35. Elastic means (not shown) keep the two moving plates 31, 32 remote from fixed plate 30 in the inoperative position.

With the leader 4 of strip 3 correctly positioned in plate 3 via positioning support 20 and with receptacles 24 of strap 6 caught in buttons 35, the movement of the first moving plate 31 towards fixed plate 30 makes it possible to attach strap 6 to buttons 21 and frees the positioning supports 20. Conversely, the displacement of the second moving plate by the set of fingers 38 disengages buttons 21, transfers the strap to buttons 35 and reengages positioning supports 20 in tape leader 4. The displacements of plates 31 and 32 can be effected manually or mechanically, e.g. by means of electromagnets.

Hereinafter, a tape reader comprising a tape unreeling device according to the invention will be described. This tape unreeling device comprises means for unreeling and positioning the tape and an optronic assembly making it possible to analyse the part of the tape traversing the reading channel. This tape reader is more specifically intended for use in a navigation system based on geographical data recorded on a film strip.

Figure 8A:
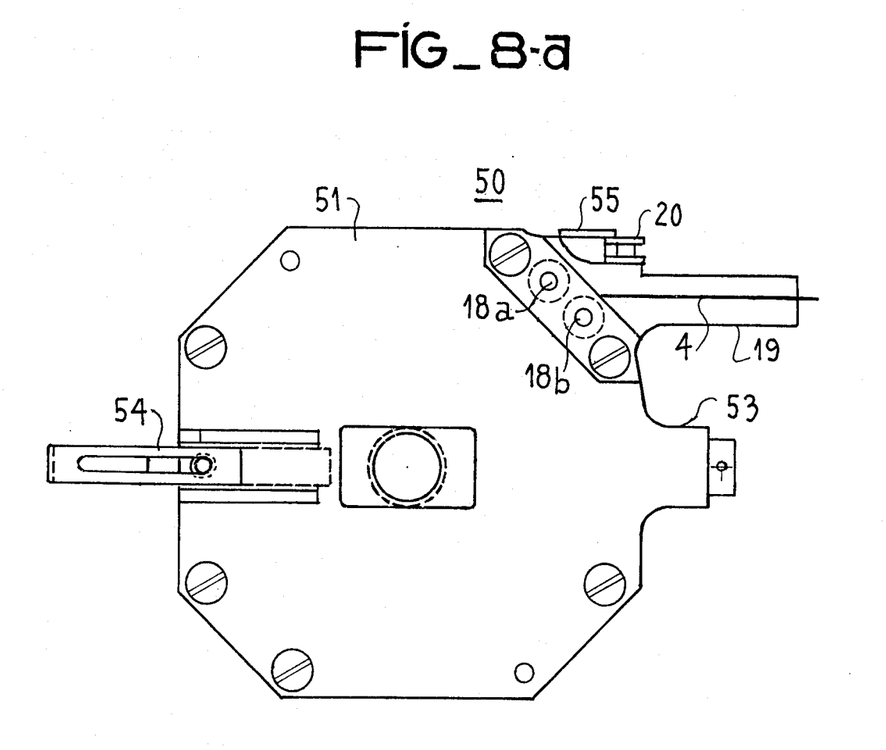
FIG. 8a a side view of a tape cassette or cartridge.

FIG. 8a is a side view of an embodiment of a film cartridge or cassette 50, which comprises a case 51 within which is arranged a feed reel on which is wound the film strip 3 to be analysed. Case 51 is provided with means 52 for plugging into the tape reader. The positioning of cartridge 50 in the tape unreeling device is brought about by guide 52 and abutment centering means 53, whilst a retractable handle 54 permits its insertion or extraction. The leader 4 of the film strip or tape is guided and positioned by lateral guides 19. The case also has positioning supports 20 for the leader of the film, a stop member 55 with respect to the positioning supports and finally guidance rollers 18a, 18b for the film.

Figure 8B:
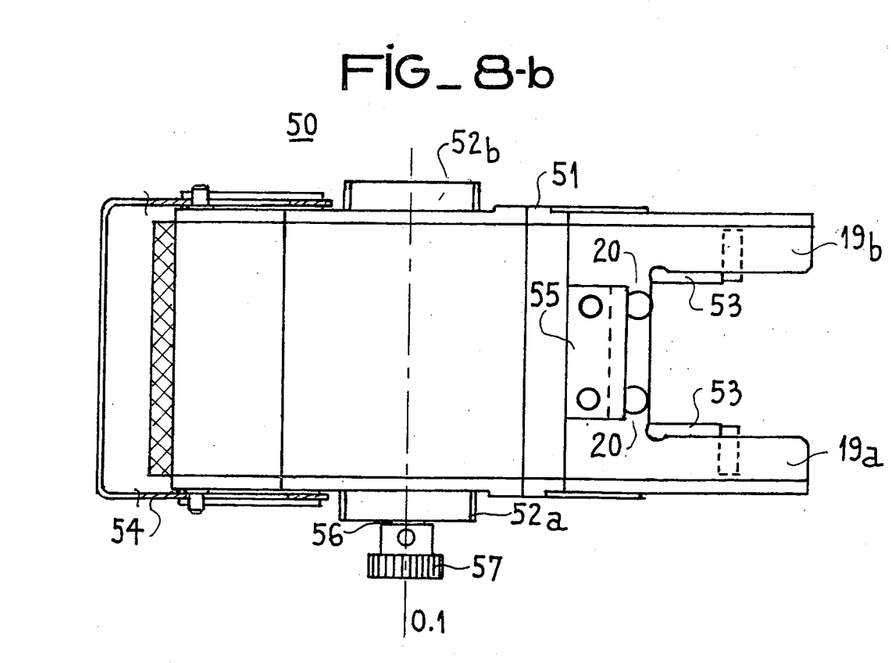

FIG. 8b is a transverse view of cartridge 50 showing the location of the positioning supports 20 for the leader of the film and the stop member 55. It is also clear that the guidance member 19 for the film comprises two lateral guides 19a, 19b in which is displaced the (not shown) film strip. It is also possible to see that the guides 52a, 52b of the cartridge are traversed by a transmission shaft 56, provided with a pinion 57.

Figure 8C:
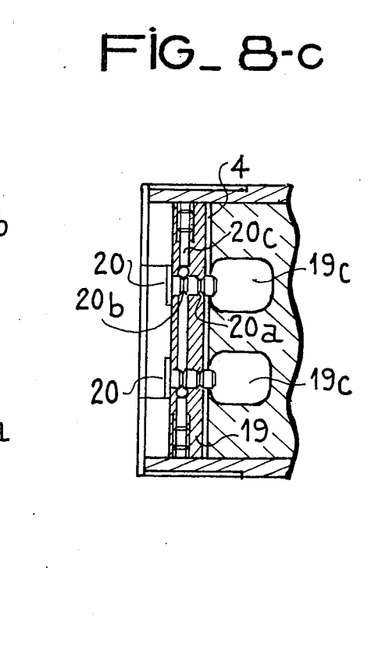

FIG. 8c shows details of the construction of positioning supports 20 or the leader of the film located in the guidance member 19 of FIG. 8b. These movable positioning supports can occupy two stable positions, namely a first position, as shown, corresponding to the locking of the film leader 4 and a second position corresponding to a film leader release position. To this end, the positioning supports comprise two circular grooves 20a, 20b in which can engage elastic ball thrusts 20c. Each of the positioning supports 20 issues into a clearance 19c for receiving movable pins 34 (FIG. 7) making it possible to raise these supports in order to free the leader of the film 4.

Figure 8D:
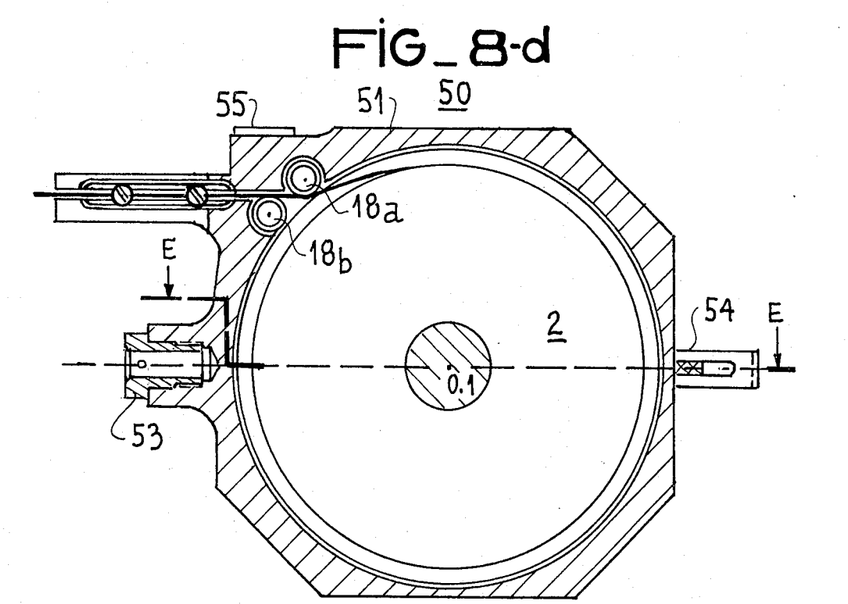

FIG. 8d is a lateral sectional view of the film cartridge 50 showing the position of feed reel 2 within case 51 and the relative position of the two guidance rollers 18a, 18b respectively.

Figure 8E:
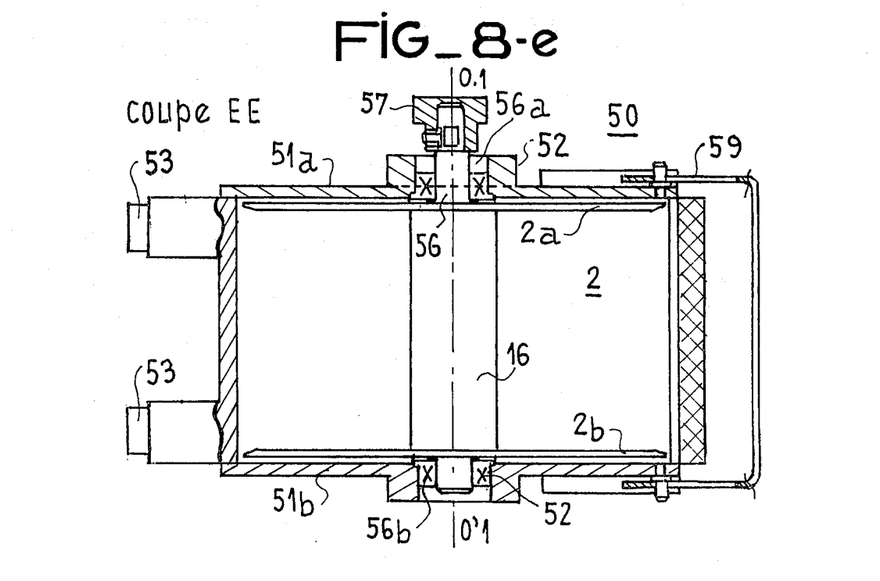

FIG. 8e is a cross-sectional view of film cartridge 50. Its substantially parallelepipedic or cylindrical case 51 has two lateral faces 51a, 51b, whereof at least one is detachable in order to permit the charging or loading of reel 2. The latter comprises a pair of flanges 2a, 2b integral with a mandrel 16, which is guided in rotation by two ball bearings 56a, 56b and has at one of its ends a keyed pinion 57 for coupling to means for rotating the said feed reel.

Figure 9:
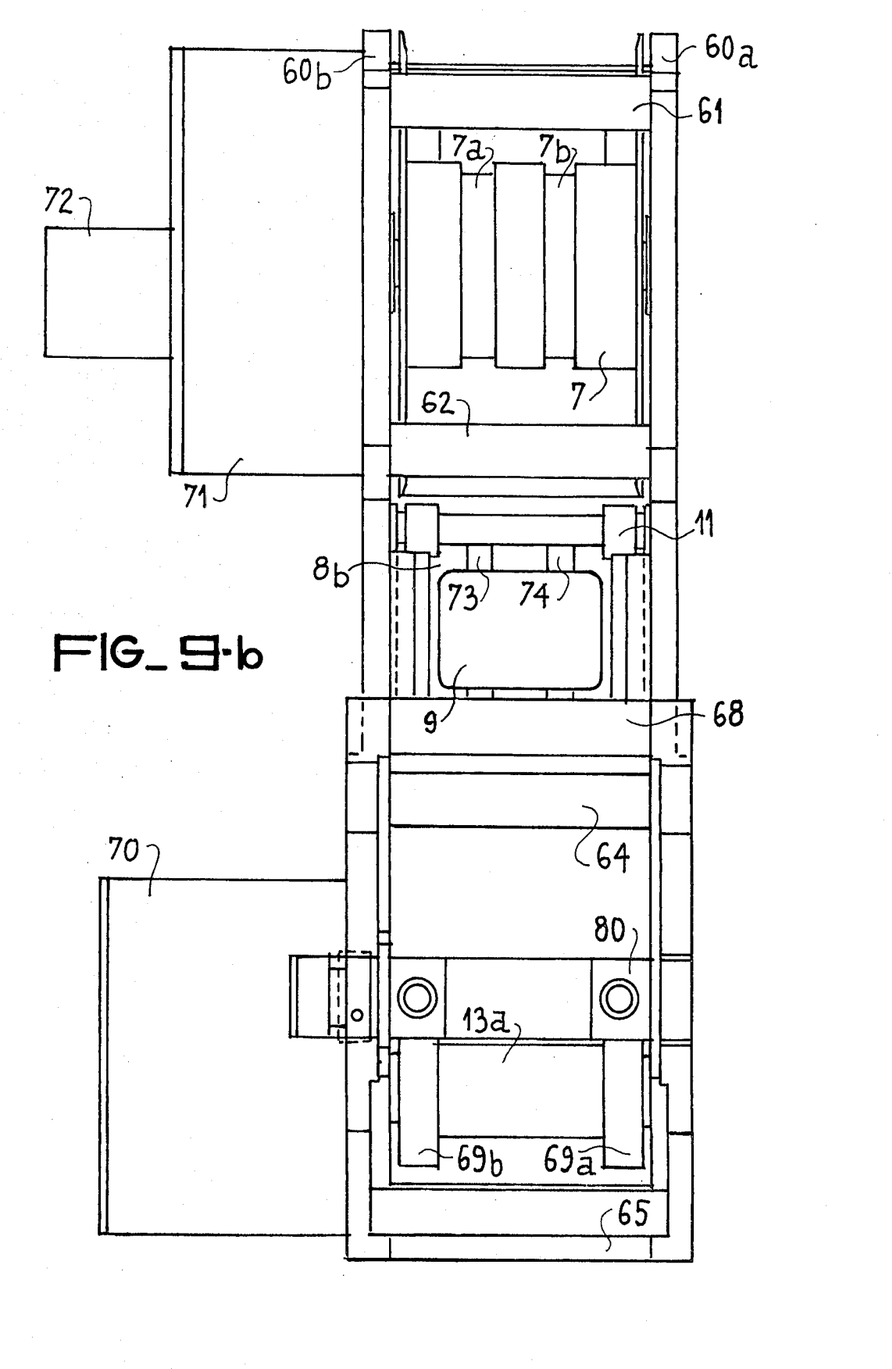
Figure 9A:
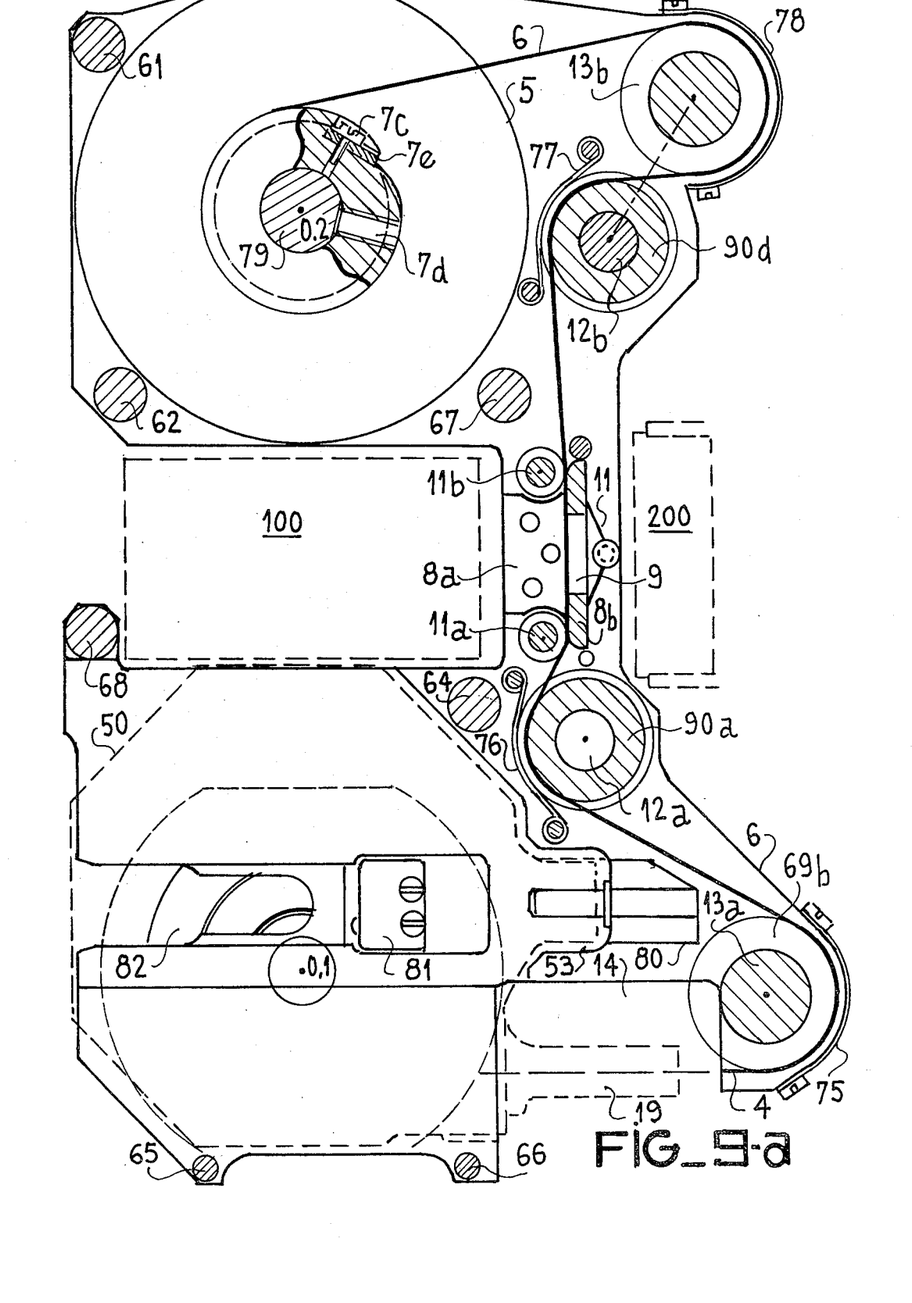
FIG. 9a a lateral sectional view of the tape reader according to the invention.

FIGS. 9a and 9b respectively show in lateral sectional and rear transverse views, an embodiment of the tape reader equipped with its film cassette. The tape reader comprises a frame having two spaced flanges 60a, 60b, joined by a set of spacers such as 61 to 67. This frame is positioned with respect to the light member 100 supplying a pencil of light for analysing the picture or image recorded on the film. The beam of light traverses the film and is analysed by an element 200, said two elements being known per se and not forming part of the present invention, so that there is no need to describe them here. The frame also supports a first motor means 70 integral with the feed reel, a second motor means 71 integral with the take-up reel 5 and an angular position transducer 72, which supplies a measuring signal of the position of the tape in an analysis window 9 of film pressing means 8b.

In FIG. 9b, it can be seen that film pressing means 8b has two grooves 73, 74 permitting the free passage of buttons 21 of the start of the film and the free end of the driving or transporting strap 6. In the same way, mandrel 7 of the take-up reel has two grooves 7a, 7b for housing said coupling means 21. Moreover, the driving strap 6 has perforations 24c for this purpose and they are appropriately spaced so as to permit buttons 21 to freely traverse the strap during winding, so that they are housed in said grooves 7a, 7b. The distance between perforations 24c and buttonholes 24 corresponds to one turn. The number and arrangement of the holes is such that it is possible to absorb the radial thickness of buttons 21. The pulleys such as 13a and 13b can be constituted by a fixed cylindrical member, equipped with a set of ball bearings 69a, 69b.

FIG. 9a shows guidance members 75 to 78 facing pulleys 12a, 12b and 13a, 13b and which have the function of preventing the strip or tape from slipping out of the pulleys, particularly when the motor means 70, 71 are not operating. Mandrel 7 of reel 2 has means for fixing the driving strap constituted, e.g. by a plate 7e fixed by screws 7c, the mandrel being fixed to its rotation shaft 79 by screws 7d. The frame also comprises a stop member 80, which engages in guidance member 53 of tape cartridge 50, a detector 81 making it possible to detect the plugging in of the cartridge and a slide 82 for receiving the cartridge guides 52.

FIG. 9c shows in the form of a sectional view, an embodiment of guidance pulleys 12a, 12b. The longitudinal and transverse positions of the film must be accurately determined. The film width tolerance does not make it possible to laterally position the film between two fixed guides. In this embodiment, the guidance members are carried on pulleys 12a, 12b, each of which comprises two cylindrical elements 90a, 90b, which are concentrically and elastically fitted into one another, each of said elements being provided with cheeks 91.

When the tape or strip has lateral perforations, one of the guidance pulleys is provided with teeth 92, whose transverse thickness is significantly less than the width of the lateral perforations of the film and whose radial thickness is equal to the length of the lateral perforations of the film. The angular position transducer 72 is mechanically coupled to the shaft and supplies an electrical signal representing the position of that portion of the tape engaged in the reading channel of the device.

In order to unambiguously know the position of the film, the successive cycles of the output signal are of transducer 72 and can be counted.

Figure 10A:
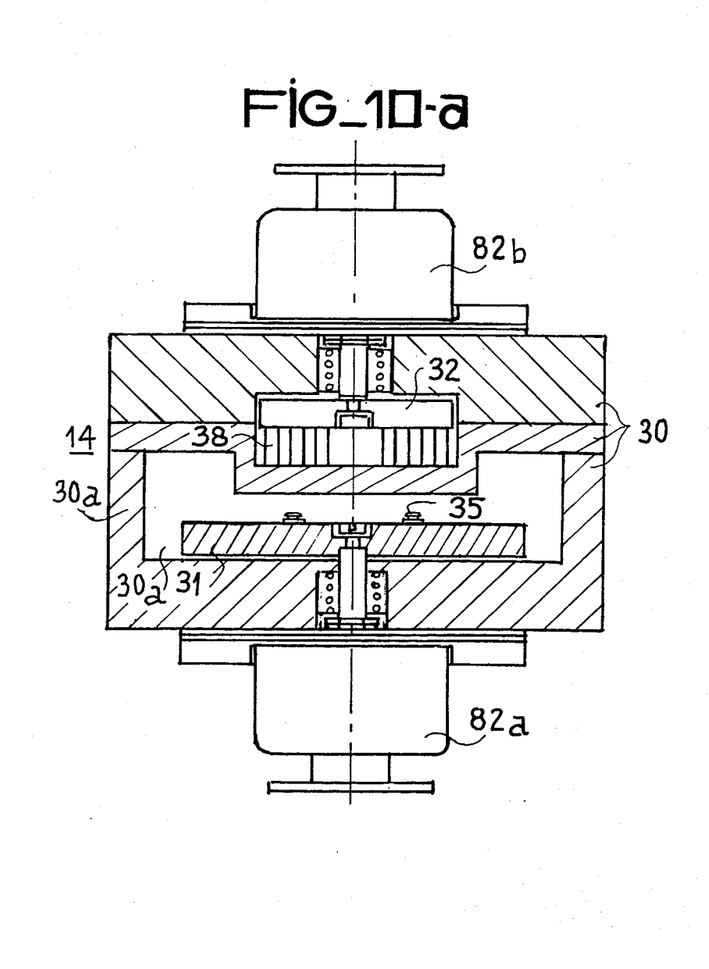
FIG. 10a a cross-sectional view of the mechanical member for coupling and uncoupling the leader of the tape.

FIG. 10a shows in the form of a cross-sectional view, an embodiment of the mechanical coupling member 14 making it possible to plug the buttons on the leader of the tape into the corresponding buttonholes located on the free end of the tape driving strap. Mechanical member 14 comprises the fixed plate 30 secured to the frame of the reader. This fixed member has an inner, U-shaped recess 30a to permit the free passage of the means 19 for positioning the tape leader 4. Within recess 30a is located the first moving plate 31, provided with retractable buttons 35 and which supply the means for attaching the free end of the tape driving strap. The second moving plate 32 is located outside fixed member 30 and faces the first moving plate, said second moving plate being provided with a set of fingers 38 for disengaging the leader of the tape and the free end of the strap driving said tape. The movements of the moving plates are ensured respectively by motor means 82a, 82b which can, for example, be in the form of conventional electromagnets controlled by (not shown) push buttons.

Figure 10B:
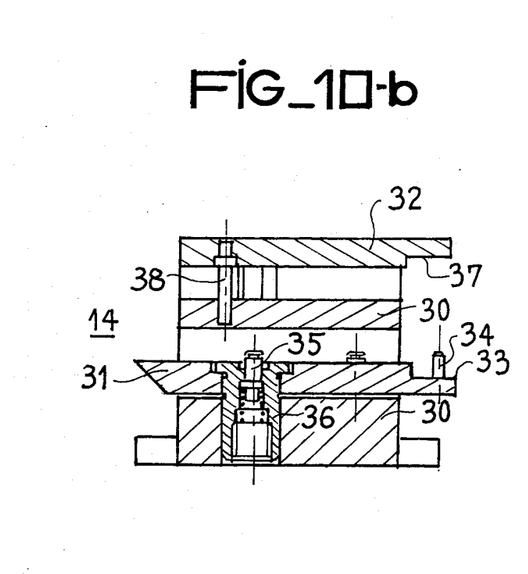

FIG. 10b shows in a partial side view, the mechanical coupling member 14 of FIG. 10a. FIG. 10b shows the first moving plate 31 with clearance 33 on which are arranged pins 34 for forcing back the positioning supports 20 of the leader 4 of the tape or strip. In the same way, the second moving plate 32 has clearance 37, which is symmetrical with clearance 33 and serves to engage the positioning supports 20 of leader 4.

The advantages resulting from the present invention are now more readily apparent. The tape or strip can be relatively wide, as well as relatively thin and flexible, because there is no need to insert the start of the tape through the guidance pulley and the reading channel. The tape cartridge is of the single reel type, i.e. has reduced overall dimensions and its introduction into the reader is then extremely simple to carry out. The coupling of the leader of the tape to the take-up reel can be completely automatic. Moreover, the unreeling device can be constructed in compact and particularly robust form, so that it can be used in equipment for vehicles exposed to severe shocks and vibrations. It is possible to accurately know the position of the tape in the reading channel.

The invention is not limited to the embodiments described and represented hereinbefore and numerous variants are possible thereto without passing beyond the scope of the invention, particularly with regards to the relative positions and shape of the various members can be matched to the applications envisaged for the tape to be analysed. When used in magnetic tape record—playback means, the record—playback heads can be retractable and can partly give way to allow the free passage of the means for coupling the driving strap to the leader of the tape. The indexing of the tape can be of a different type and in particular can be provided by electronic or optronic means.

A tape unreeling device according to the invention is used in equipment for reading and/or recording analog or digital data on tape. The tape to be unwound can be of various types, e.g. plastic film, paper tape or metallic or metallized tape.

What is claimed is:
1. A tape unreeling device comprising:
a feed reel on which is wound a tape provided with a leader;

a take-up reel for receiving said tape, wherein the take-up reel includes a strap for pulling the tape;

coupling means provided for placing the free end of said strap adjacent said leader of the tape and for joining said strap and said leader together during coupling and for disengaging said strap and said leader during uncoupling, said strap and said leader being provided with mutual coupling elements, wherein the coupling means comprise a set of buttons on said leader and a set of corresponding buttonholes on said strap, wherein said mechanical device comprises an element for positioning and guiding said leader of the tape and, facing said positioning element, a moving plate for causing the said buttons to be plugged into the set of buttonholes positioned on the end of the free portion of the driving strap, and wherein the positioning element includes retractable positioning supports for transversely engaging in perforations located on said leader of the tape.

2. An unreeling device according to claim 1, wherein the tape driving strap is a metal tape.

3. An unreeling device according to claim 1, wherein the mechanical device also comprises means for uncoupling the buttons from the buttonholes, said uncoupling means incorporating a second moving plate having a group of mobile fingers, and wherein said leader of the tape has perforations for ensuring the free passage of said fingers.

4. An unreeling means according to claim 3, wherein the perforations for the passage of the mobile fingers are arranged regularly and respectively about the buttons located on said leader of the film.

5. An unreeling means according to claim 1, wherein complementary perforations are provided on the strap for receiving the buttons during winding.

6. A tape reader comprising:

a frame;

a tape cartridge mounted on said frame, said tape cartridge including a keyed case, a feed reel in said case, a tape having a leader on said feed reel, means on said cartridge for positioning said leader relative to said case, and buttons on said leader, wherein said leader has perforations and said leader positioning means includes a set of retractable positioning supports corresponding to said perforations;

a film pressing means including a reading window, said film pressing means being mounted on said frame;

tape guidance pulleys mounted on said frame on either side of said film pressing means;

a take-up reel mounted on said frame; and a strap having one end fixed to said take-up reel and a second end having buttonholes engagable by said buttons of said leader when said leader is on said pulleys.

7. A tape reader according to claim 6, including a mechanical member for coupling and uncoupling said leader and the second end of the strap, said mechanical coupling member having two movable plates connected to the frame and positioned one on either side of the tape leader positioning means, one of the said plates being provided with a set of retractable buttons and the other with a set of fingers.

8. A tape reader according to claim 6, wherein the guidance pulleys comprise two elastically nested coaxial cylindrical elements.

9. A tape reader according to claim 6, wherein one of said guidance pulleys includes teeth for engaging in said perforations, said leader including an angular position transducer to which said one pulley is physically coupled.

* * * * *